United States Patent [19]

Yoshioka et al.

[11] Patent Number: 4,560,325

[45] Date of Patent: Dec. 24, 1985

[54] BEARING SUPPORT FOR TURBOCHARGERS

[75] Inventors: Masahiro Yoshioka; Muneo Mizumoto, both of Ibaraki; Koichiro Yamada, Mito, all of Japan

[73] Assignee: Hitachi, Ltd., Tokyo, Japan

[21] Appl. No.: 452,874

[22] Filed: Dec. 27, 1982

[30] Foreign Application Priority Data

Jan. 6, 1982 [JP] Japan .................................. 57-320

[51] Int. Cl.$^4$ .................... F04B 17/00; F16C 19/55
[52] U.S. Cl. ..................................... 417/407; 384/901
[58] Field of Search ............... 417/406, 407, 408; 384/287; 308/DIG. 4, DIG. 11

[56] References Cited

U.S. PATENT DOCUMENTS

| | | | |
|---|---|---|---|
| 2,051,704 | 8/1936 | Harris | 308/DIG. 11 |
| 2,198,376 | 4/1940 | Cederburg | 308/DIG. 11 |
| 3,565,497 | 2/1971 | Miller | 417/407 |
| 4,138,168 | 2/1979 | Herlitzek | 308/DIG. 11 |
| 4,204,718 | 5/1980 | Bosco | 308/DIG. 4 |
| 4,344,630 | 8/1982 | Veres | 308/DIG. 4 |

FOREIGN PATENT DOCUMENTS

| | | | |
|---|---|---|---|
| 203249 | 9/1955 | Australia | 308/DIG. 4 |
| 660268 | 3/1963 | Canada | 417/407 |
| 2437530 | 12/1976 | Fed. Rep. of Germany | 417/407 |
| 388021 | 5/1965 | Switzerland | 417/407 |
| 2035470 | 6/1980 | United Kingdom | 384/286 |
| 165039 | 10/1964 | U.S.S.R. | 417/407 |

Primary Examiner—Carlton R. Croyle
Assistant Examiner—Timothy S. Thorpe
Attorney, Agent, or Firm—Antonelli, Terry & Wand

[57] ABSTRACT

A turbocharger having a rotor shaft supported by bearing portions of a bearing housing through floating bushes. Holders for the floating bushes are replaceably secured to the inner peripheral surfaces of the bearing portions opposing to the outer peripheral surfaces of the floating bushes. When the holders are worn down, the holders solely can be replaced with new ones, so that it is not necessary to renew the bearing housing as a whole.

4 Claims, 7 Drawing Figures

BEARING SUPPORT FOR TURBOCHARGERS

BACKGROUND OF THE INVENTION

The present invention relates to a turbocharger for use in intake system of automotive engines and, more particularly, to an improvement in the construction of bearing support in the turbocharger.

Generally, a turbocharger has a rotor shaft which carries at a turbine rotor at one end thereof, with a compressor rotor at the other end thereof. The rotor shaft is supported by radial bearings for bearing the radial load and a thrust bearing for bearing thrust load acting on the rotor shaft. Various types of bearings for bearing radial load have been proposed in which most popular is a floating bush type bearing such as that disclosed in U.S. Pat. No. 3,565,497, with the proposed floating bush type bearing has floating bushes rotatably disposed between the rotor shaft and the bearing housing.

Turbochargers are mass-produced in various sizes to match the capacities of various engines. From a view point of mass-production, it is preferred that these turbochargers of various sizes use a common housing of the same size and shape. However, the size of the turbine section having the turbine rotor and the size of the compressor section having the compressor rotor, as well as the operation speed of the turbocharger, vary depending on the capacity of the turbocharger. As a natural result, turbochargers having different capacities have a different span between bearings. For these reasons, it has been impossible to use a common housing for turbochargers having different capacities.

Another problem arises from the wear of the inner and outer peripheral surfaces of the floating bushes and wear of the inner peripheral surface of a bearing housing which embraces the outer peripheral surfaces of the floating bushes. The wear of the sliding parts of floating bushes and bearing housing are serious particularly in the turbine side of the turbocharger, because the floating bush and a portion of the bearing housing at this side are subjected to the high temperature of the exhaust gas driving the turbine. There are natural allowable limits in the amounts of wear in these sliding parts, in order to maintain the required performance of the turbocharger and to avoid generation of excessive vibration. If the wear exceeds the allowable limit, it is necessary to replace the worn part such as the floating bushes and the bearing housing, otherwise the performance of the turbocharger may seriously deteriorate. The frequent renewal of the bearing housing, however, is quite inconvenient from the view point of saving and utilization of natural resources.

SUMMARY OF THE INVENTION

Accordingly, an object of the invention is to provide a turbocharger which eliminates the necessity for replacing a bearing housing accomodating the floating bushes.

Another object of the invention is to provide a turbocharger which is designed and constructed to permit the a common bearing housing regardless of the capacities of the turbocharger.

According to the invention, a turbocharger is provided having a rotor shaft supported through a pair of floating bushes by portions of a bearing housing opposing to the floating bushes. Holders for the floating bush are replaceably attached to the portions of the inner peripheral surface of the bearing housing opposed by the outer peripheral surfaces of the floating bushes, with a first securing means being provided for securing the holders to the inner peripheral surface of the bearing portions. The holders are rotatably provided on inner peripheral surfaces thereof with respective floating bushes which are located by a second securing means.

Other objects, features and advantages of the invention will become clear from the following description of the preferred embodiment taken in conjunction with the accompanying drawings.

DETAILED DESCRIPTION

Figure 1:
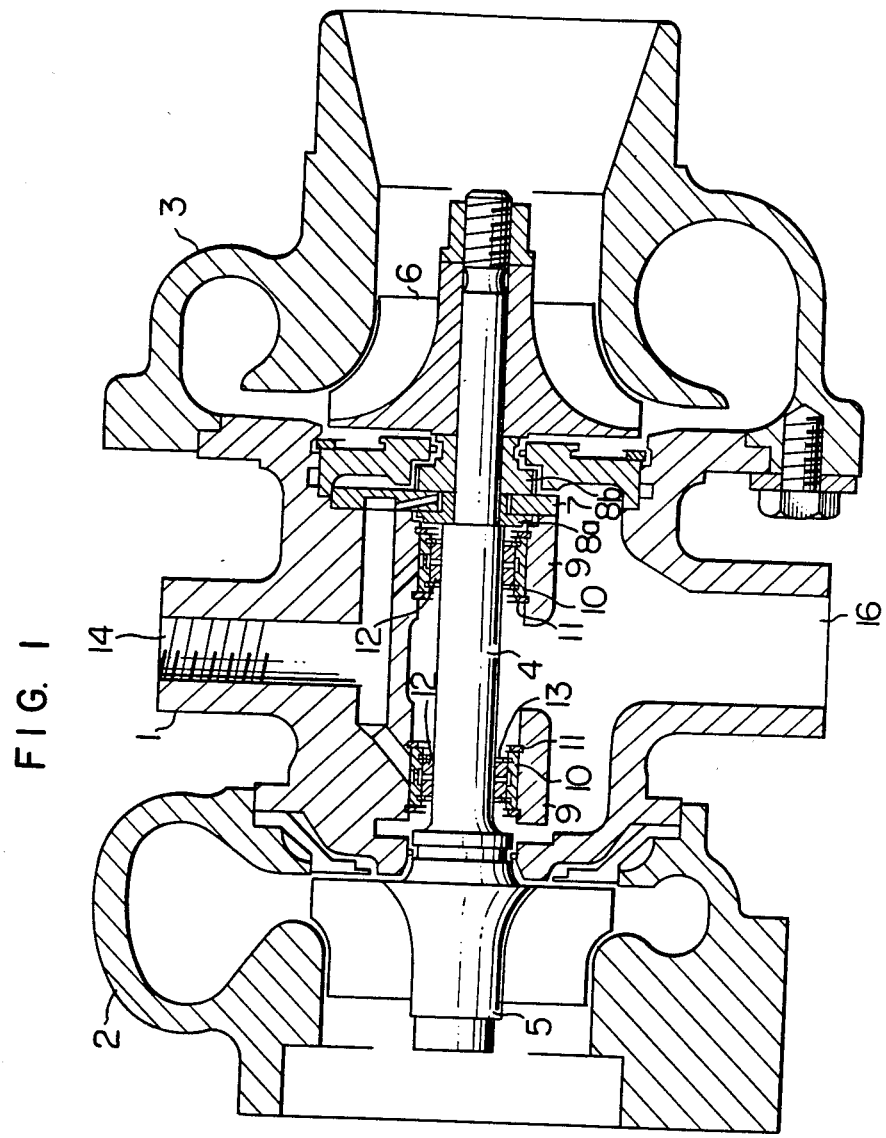
FIG. 1 is a vertical sectional view of a turbocharger in accordance with one embodiment of the invention.
Figure 2:
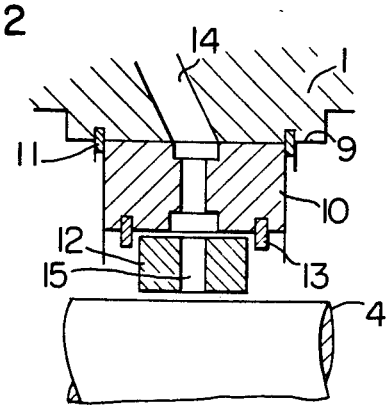
FIG. 2 is an enlarged vertical sectional view of the bearing portion of the turbocharger of FIG. 1.

Referring first to FIG. 1, a turbocharger includes a housing assembly composed of a center housing 1 constituting a bearing housing, a turbine housing 2 and a compressor housing 3. A rotor shaft 4 carries a turbine rotor 5 and a compressor rotor 6, with the turbine rotor 5 being located in the turbine housing 2, while the compressor rotor 6 is housed by the compressor housing 3. A thrust bearing disposed behind the compressor rotor 6 is composed of a thrust being member 7 fixed to the center housing 1 and thrust collars 8a, 8b provided on the rotor shaft 4. The center housing 1 is provided at its portions near the turbine housing 2 and the compressor housing 3 with bearing portions 9 for rotatably supporting the rotor shaft 4. As shown in FIG. 2, each bearing portion 9 is provided on its inner peripheral surface with a replaceable holder 10 for a 12 floating bush. The holder 10 is fixed against movement in the axial direction by snap rings 11 fitted in the inner surface of the bearing portion 9 and making tight contact with respective axial ends of the holder 10. The 12 is rotatably disposed in the annular space between the inner peripheral surface of the holder 10 and the outer peripheral surface of the rotor shaft 4. The floating bush 12 is located by snap rings 13 disposed in the inner peripheral surface of the holder 10. To supply lubricating oil to the floating bush 12, the lubricating oil is supplied into the annular gap between the inner peripheral surface of the holder 10 and the outer peripheral surface of the floating bush 12 through a passageway 14 formed in the center housing 1 and the holder 10 and is further introduced into the annular gap between the inner peripheral surface of the floating bush 12 and the outer peripheral surface of the rotor shaft 4 through a lubricating oil port 15 formed in the floating bush 12. The lubricating oil after the lubrication is discharged to the outside through an oil discharging port 16 formed in the center housing.

As the turbocharger operates for a long time, the inner peripheral surface of the holder 10 is worn down as a result of frictional contact with the outer peripheral surface of the floating bush 12. In such a case, in the conventional turbochargers, it is necessary to replace the whole center housing 1 even though wear takes place only in the areas contacting the floating bushes 12. However, according to the invention, the replacement of the whole center housing 1 is not necessary and it is sufficient to only replace the holders 10.

It is possible to produce the holder 10 on the side of the turbine from a wear-resistant material. By so doing, the wear of holder 10 on the turbine side, subjected to high temperature transmitted from the exhaust gas, is suppressed to realize an equal rate of wear of the holders 10 at the side of the turbine and at the side of the compressor. Needless to say, it is easy to replace the floating bush 12 together with the holder 10, in the event that the inner and/or outer peripheral surface of the floating bush 12 has been worn down to an unacceptable degree.

Figure 3:
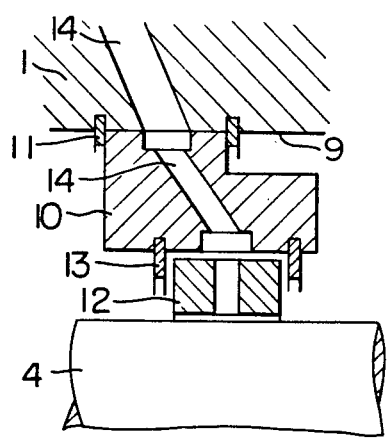
FIG. 3 is an enlarged vertical sectional view of an example of a replaceable member incorporated in the turbocharger of the invention.

In FIGS. 1 and 2, the floating bush 12 is disposed substantially at the mid-portion of the holder 10. This, however, is not exclusive and, as shown in FIG. 3, the holder 10 is so shaped and sized that the positions of the snap rings 13 for the floating bush 12 are axially offset from the positions of the snap rings 11 for the holders 10 so that the span of the floating bushes 12 is changed. By using the holders 10 of FIG. 3, it is possible to obtain any desired span of the floating bushes 12 to cope with demands for various capacities of turbochargers. This means that the same center housing can be used for various turbochargers having different capacities. Needless to say, the necessity for the replacing the center housing as a whole due to wear down can be eliminated.

Figure 4:
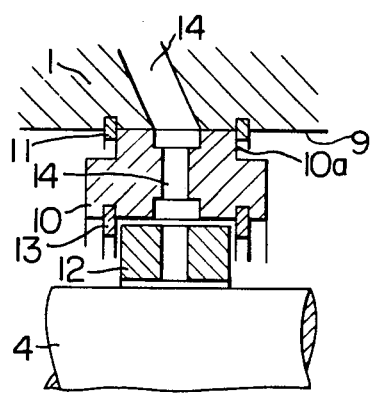
FIG. 4 is an enlarged vertical sectional view of another embodiment of the replaceable member in the turbocharger of the invention.

As shown in FIG. 4, each holder 10 is cut at both axial ends of outer peripheral surface thereof to provide shoulders 10a, and snap rings 11 for fixing the holder 10 are secured to the bearing portion 9 so as to abut the vertical walls of the shoulders 10a. This arrangement offers an advantage that, since the snap ring 11 is located at the inner side of the outer extremities of the holder 10, the spaces for accomodating the snap rings 11 are saved to permit a compact construction of the center housing 1. In addition, the replacement of the holders 10 is possible as in the case of the first embodiment.

Figure 5:
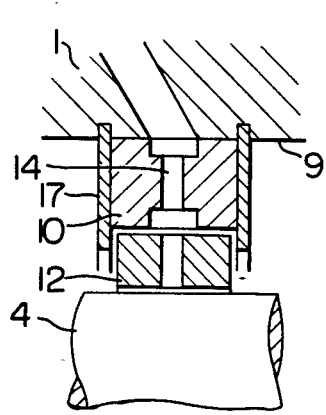
FIG. 5 is an enlarged vertical sectional view of still another embodiment of the replaceable member in the turbocharger of the invention.

In FIG. 5, the 12 and the floating bush holder 10 are positioned by common snap rings 17, whereby it is possible to reduce the number of parts to simplify the construction and advantageously reduce the cost to enable a replacement the renewal of a worn down holder 10.

Figure 6:
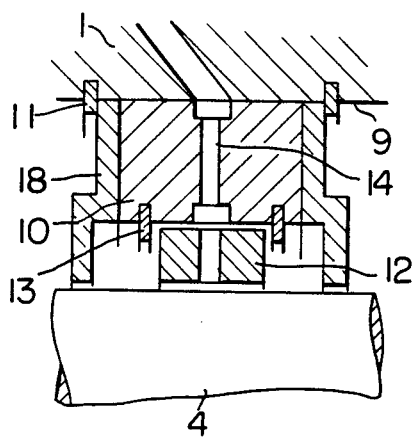
FIG. 6 is an enlarged vertical sectional view of a further embodiment of the replaceable member in the turbocharger of the invention.

As shown in FIG. 6, seal members 18 are disposed at both sides of the holder 10, and are fixed together with the floating bush holder 10 by the snap rings 11. The sealing members 18 permit the control of a rate of supply of the lubricating oil into the floating bush 12 and decrease the rate of leak of lubricating oil. Needless to say, the replacement of a worn down holder 10 can be made equally easily as the embodiment described hereinabove.

Figure 7:
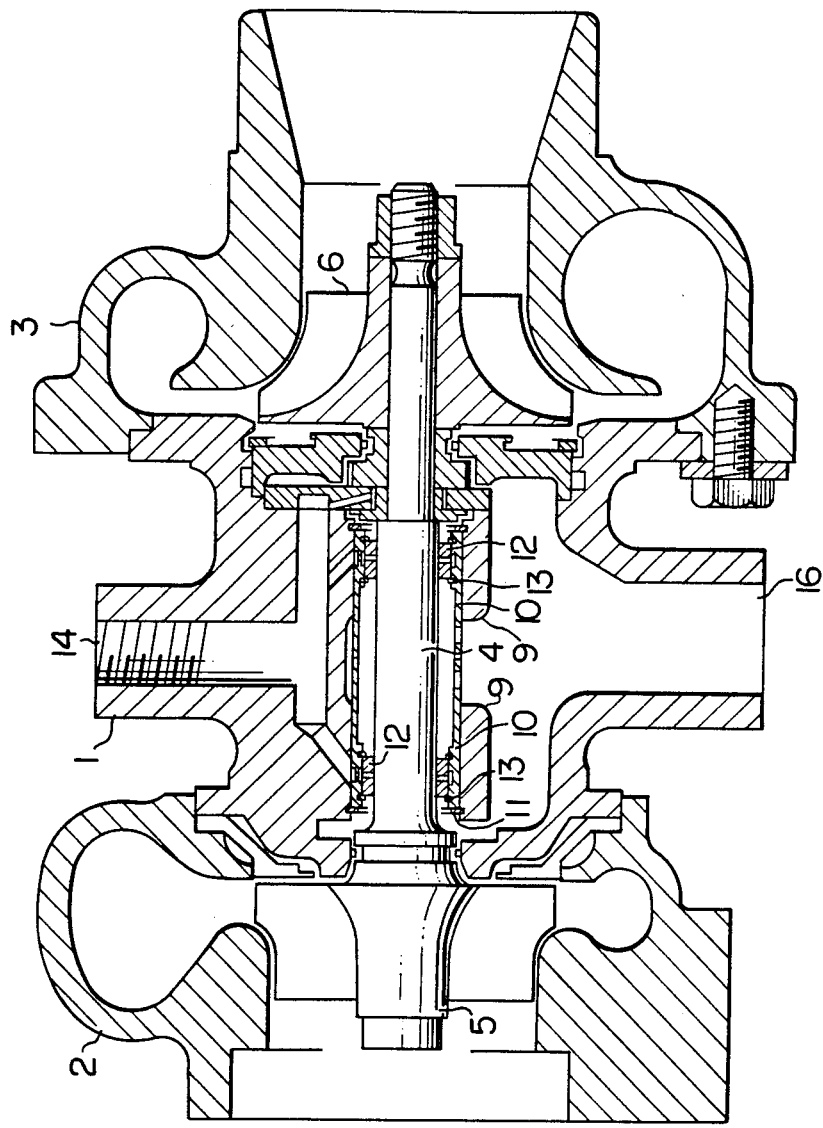
FIG. 7 is a vertical sectional view of a turbocharger in accordance with another embodiment of the invention.

In FIG. 7, a turbocharger is provided wherein the opposing ends of the holders 10, of two bearing portions 9, abut each other. The holders 10, are fixed to the bearing portion 9 by snap rings 11 which act on the remote ends of the holders 10. By so doing, it is possible to reduce the number of the snap rings employed, with the replacement of worn down holders 10 also being possible, and it is even possible to integrate two holders. As can readily be appreciated, the modifications explained hereinabove in connection with FIGS. 3 to 6 are also applicable to the embodiment shown in FIG. 7.

As described hereinabove, according to the invention, the necessity for the replacement of the bearing housing as a whole due to wear down of the brush holders is advantageously eliminated. Additionally, it is possible to provide a common bearing housing for turbochargers having different capacities.

What is claimed is:

1. A turbocharger comprising a rotor shaft, a pair of floating bush means for supporting said rotor shaft by portions of a bearing housing disposed in opposition to the floating bush means, a pair of holder means replaceably attached to inner peripheral surface portions of the bearing housing opposed by outer peripheral surfaces of said floating bush means, first securing means for securing said holder means to the inner peripheral surface portions of the bearing housing, said floating bush means being rotatably disposed on inner peripheral surfaces of the respective holder means, and second securing means for securing said floating bush means in a predetermined position relative to said holder means, wherein said pair of holder means respectively include first ends and second ends, said holder means replaceably disposed in said portions of said bearing housing with the first ends thereof in abutment with each other, and wherein said first securing means includes snap ring means for respectively securing the second ends of said holder means to the portions of said bearing housing.

2. A turbocharger according to claim 1, wherein said second securing means includes further snap ring means adapted to be fitted into inner peripheral surfaces of said floating bush holder means, each of said snap rings being shaped so as to permit attaching of said second securing means at an axial offset from a portion to which said first securing means is fitted.

3. A turbocharger according to claim 1, wherein said snap ring means are adapted to be fitted to inner peripheral surfaces of said portions of said bearing housing so as to be disposed inside outer extremities of the respective bush holder means.

4. A turbocharger according to claim 1, wherein said first securing means and said second securing means are constructed integrally with each other.

* * * * *